(12) United States Patent
Peiffer

(10) Patent No.: US 7,917,601 B1
(45) Date of Patent: *Mar. 29, 2011

(54) AGENT-BASED EVENT-DRIVEN WEB SERVER ARCHITECTURE

(75) Inventor: Christopher Peiffer, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/794,564

(22) Filed: Jun. 4, 2010

Related U.S. Application Data

(63) Continuation of application No. 11/888,005, filed on Jul. 31, 2007, now Pat. No. 7,747,707, which is a continuation of application No. 09/974,292, filed on Oct. 9, 2001, now Pat. No. 7,263,550.

(60) Provisional application No. 60/239,544, filed on Oct. 10, 2000, provisional application No. 60/308,234, filed on Jul. 26, 2001.

(51) Int. Cl.
*G06F 15/16* (2006.01)

(52) U.S. Cl. .......................... 709/219; 709/217; 370/532

(58) Field of Classification Search .......... 709/217–219; 370/532
See application file for complete search history.

(56) References Cited

U.S. PATENT DOCUMENTS

| 5,826,261 | A  | 10/1998 | Spencer |
| 5,828,840 | A  | 10/1998 | Cowan et al. |
| 5,848,246 | A  | 12/1998 | Gish |
| 5,850,517 | A  | 12/1998 | Verkler et al. |
| 5,867,661 | A  | 2/1999  | Bittinger et al. |
| 5,908,469 | A  | 6/1999  | Botz et al. |
| 5,918,013 | A  | 6/1999  | Mighdoll et al. |
| 6,029,182 | A  | 2/2000  | Nehab et al. |
| 6,052,718 | A  | 4/2000  | Gifford |
| 6,058,428 | A  | 5/2000  | Wang et al. |
| 6,076,108 | A  | 6/2000  | Courts et al. |
| 6,078,953 | A  | 6/2000  | Vaid et al. |
| 6,092,099 | A  | 7/2000  | Irie et al. |
| 6,098,093 | A  | 8/2000  | Bayeh et al. |
| 6,128,655 | A  | 10/2000 | Fields et al. |
| 6,185,598 | B1 | 2/2001  | Farber et al. |
| 6,216,164 | B1 | 4/2001  | Zaremba, Jr. |
| 6,247,009 | B1 | 6/2001  | Shiiyama et al. |
| 6,266,369 | B1 | 7/2001  | Wang et al. |
| 6,269,357 | B1 | 7/2001  | Nakayama et al. |
| 6,275,301 | B1 | 8/2001  | Bobrow et al. |
| 6,304,676 | B1 | 10/2001 | Mathews |
| 6,434,559 | B1 | 8/2002  | Lundberg et al. |
| 6,446,028 | B1 | 9/2002  | Wang |
| 6,519,636 | B2 | 2/2003  | Engel et al. |
| 6,598,167 | B2 | 7/2003  | Devine et al. |
| 6,718,390 | B1 | 4/2004  | Still et al. |
| 6,725,272 | B1 | 4/2004  | Susai et al. |
| 6,771,646 | B1 | 8/2004  | Sarkissian et al. |

(Continued)

*Primary Examiner* — Wing F Chan
*Assistant Examiner* — Razu A Miah
(74) *Attorney, Agent, or Firm* — Shumaker & Sieffert, P.A.

(57) ABSTRACT

A networking device, method, and web server software architecture are provided. The device may include a web server application program configured to run on an operating system of the device, and an event-based signaling mechanism configured to signal the web server application program when data has arrived on a socket of the operating system, by triggering an operating system-level signaling event. The web server application program is configured to read data off of the socket in response to detecting the event, without polling the socket first to determine that data is ready to be read from the socket.

13 Claims, 7 Drawing Sheets

U.S. PATENT DOCUMENTS

| | | |
|---|---|---|
| 6,834,326 B1 | 12/2004 | Wang et al. |
| 7,007,092 B2 | 2/2006 | Peiffer |
| 7,007,104 B1 | 2/2006 | Lewis et al. |
| 7,010,573 B1 | 3/2006 | Saulpaugh et al. |
| 7,263,550 B1 | 8/2007 | Peiffer |
| 7,346,691 B2 | 3/2008 | Peiffer |
| 7,373,395 B2 * | 5/2008 | Brailean et al. ............... 709/219 |
| 7,747,707 B1 | 6/2010 | Peiffer |
| 2001/0039586 A1 | 11/2001 | Primak et al. |
| 2002/0042839 A1 | 4/2002 | Peiffer et al. |
| 2002/0048269 A1 | 4/2002 | Hong et al. |
| 2002/0062372 A1 | 5/2002 | Hong et al. |
| 2002/0073165 A1 | 6/2002 | McNulty et al. |
| 2002/0174194 A1 | 11/2002 | Mooney et al. |
| 2003/0028433 A1 | 2/2003 | Merriman et al. |
| 2003/0037108 A1 | 2/2003 | Peiffer et al. |
| 2003/0133475 A1 * | 7/2003 | Solheim et al. ............... 370/532 |
| 2005/0027837 A1 * | 2/2005 | Roese et al. .................. 709/223 |
| 2006/0037075 A1 * | 2/2006 | Frattura et al. .................. 726/22 |
| 2007/0005731 A1 * | 1/2007 | Lection et al. ............... 709/219 |

* cited by examiner

AGENT-BASED EVENT-DRIVEN WEB SERVER ARCHITECTURE

CROSS REFERENCE TO RELATED APPLICATIONS

This application is a continuation of U.S. application Ser. No. 11/888,005, filed Jul. 31, 2007, which is a continuation of U.S. application Ser. No. 09/974,292, filed Oct. 9, 2001, which claims the benefit under 35 U.S.C. §119(e) of U.S. Provisional Patent Application No. 60/239,544, filed Oct. 10, 2000, and U.S. Provisional Patent Application No. 60/308,234, filed on Jul. 26, 2001. These applications are herein incorporated by reference in their entireties.

TECHNICAL FIELD

The present invention relates generally to data transmission on computer networks, and more particularly to networking devices and methods that employ an agent-based and/or event-driven web server software architecture.

BACKGROUND OF THE INVENTION

The Internet has experienced explosive growth in recent years. The emergence of the World Wide Web has enabled millions of users around the world to download easily web pages containing text, graphics, video, and sound data while at home, work, or from remote locations via wireless devices. These web pages often are large in size and therefore require a long time to download, causing the user delay and frustration. Delay often causes users to abandon the requested web page and move on to another web page, resulting in lost revenue and exposure for many commercial web sites.

Delay downloading a web page can be caused by a number of factors. For example, at the server, a large volume of page requests may overload the capacity of the server and result in unanswered or late-answered requests. One specific factor in delay at the server is caused by the server program inefficiently reading and writing data to and from network sockets. Another factor in delay is that management of a large number of connections by a web server can slow down the server, because the connections must be polled to determine whether any activity has occurred on the connections. This consumes valuable processor time, slowing down the rate at which the server may respond to requests. A third factor in delay is that server socket queues may become congested with requests that are computationally intensive, such as downloading a large image, thus slowing down smaller requests queued up behind these computationally intensive requests.

These factors and many others combine to delay current web server response time, frustrating users with long wait times for downloading web pages. Thus, a need exists for systems, methods, and devices that decrease web server delay, to create a more pleasurable web browsing experience.

SUMMARY OF THE INVENTION

A networking device, method, and software architecture are provided. The device may include a web server application program configured to run on an operating system of the device, and an event-based signaling mechanism configured to signal the web server application program when data has arrived on a socket of the operating system, by triggering an operating system-level signaling event. The web server application program is configured to read data off of the socket in response to detecting the event, without polling the socket first to determine that data is ready to be read from the socket.

The method may include receiving data from a client at a client socket on a networking device and creating an operating system-level event in response to receiving the data. The method may further include detecting the event from a component of a web server application program executed on the networking device, and in response, reading data off of the socket with the web server application program, without polling the socket to determine whether data is ready to read on the socket. The method may also include sending the data to a target web server, and in response to the sent data, receiving data from the target server at the networking device. The method may also include forwarding the data received from the target server, from the networking device to the client.

According to another aspect of the invention, the method may include receiving data from a network at a networking device, temporarily storing the data on a socket of the networking device, detecting the data stored on the socket using an operating system-level software component, and alerting an application-level process that data is ready to be read on the socket by creating an operating system-level signaling event. The method may further include detecting the event at the application level, and in response, reading the data from the socket via the application-level process.

The software architecture may include an operating system configured to read data from a network and temporarily store the data in a socket for access by an application program. The architecture may further include an operating system-level filter configured to detect when data has reached the socket from the network, and in response, trigger an operating system-level event to instruct an application program to read data from the socket. Typically the socket is not polled by the application program to determine whether data is ready to be read on the socket.

According to another aspect of the invention, the networking device may include a web server application program configured to run on an operating system having sockets for communicating with a network, and an operating system-level event-based means for signaling the arrival of data on the socket to the web server application program. The device may further include multiplexing agent means for associating a client session with one or more server sessions managed by the web server application program.

According to another aspect of the invention, the device may include a proxy web server positioned intermediate a client and a target web server on a network, and a plurality of multiplexing agents managed by the web server. The agents are typically configured to multiplex data from a number of client sessions to a smaller number of target server sessions.

According to another aspect of the invention, the device may include a proxy web server positioned intermediate a client and a target web server on a network, and means for multiplexing data from a number of client sessions to a smaller number of server sessions managed by the web server.

DETAILED DESCRIPTION OF THE INVENTION

Figure 7:
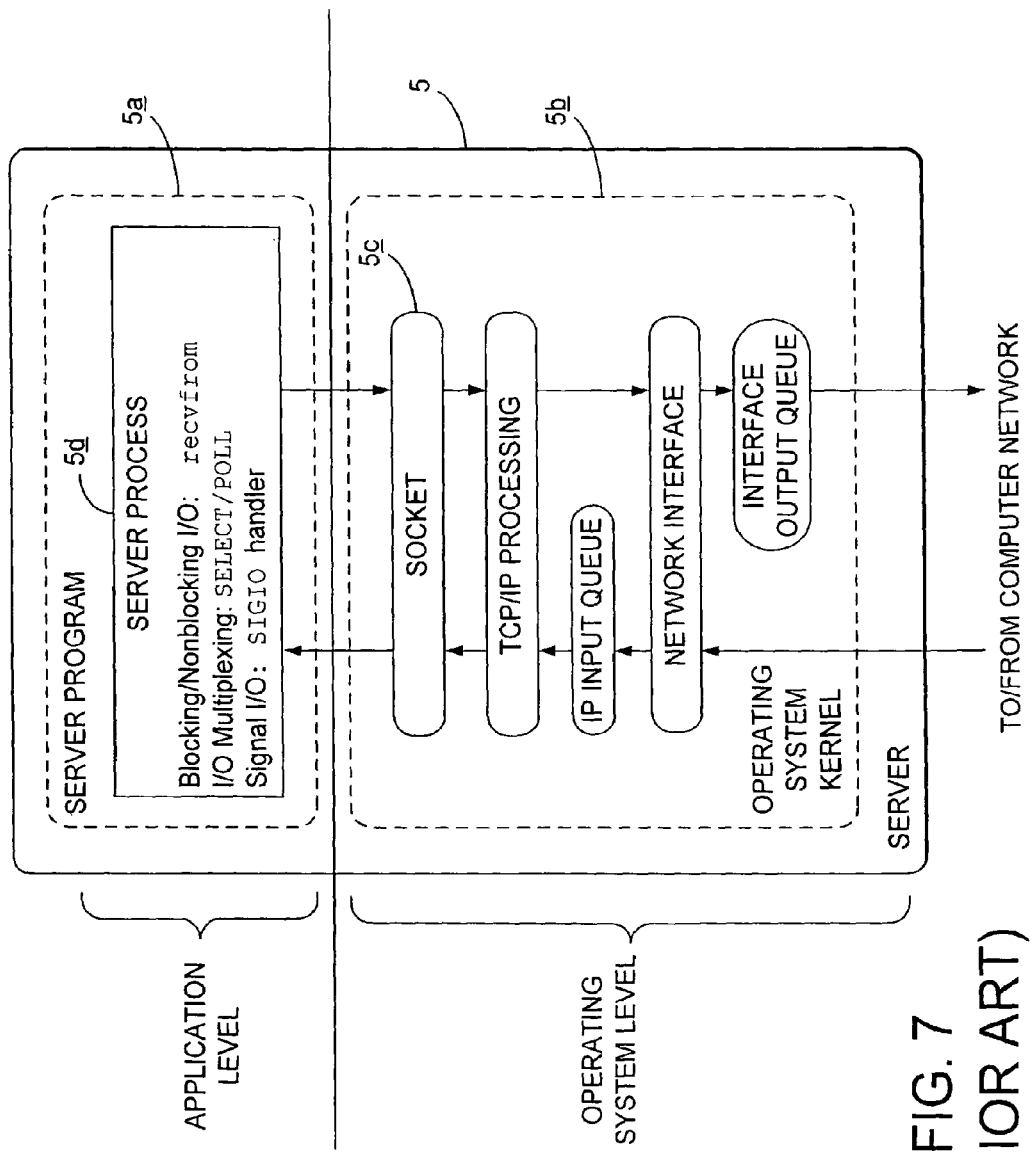
FIG. 7 is a schematic view of a prior art server.
Figure 8:
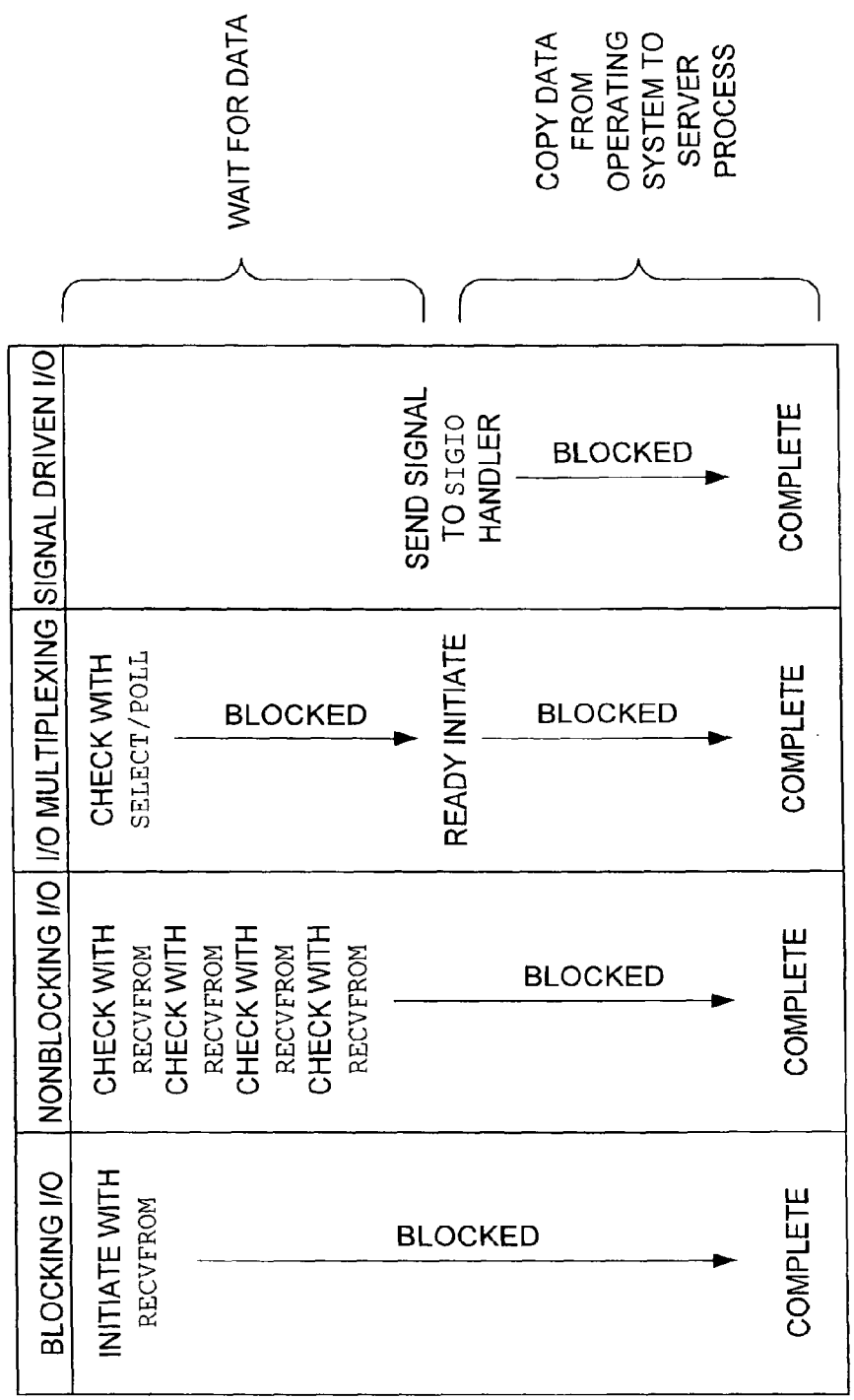
FIG. 8 is a diagram of a prior art input/output methods.

Referring initially to FIGS. 7-8, a prior art computing device is shown generally at 5. Prior art computing device 5 typically includes a server program 5a and an operating system kernel 5b. Server program 5a is configured to read and write data to and from an external computer network using input/output routines in the kernel 5b. As data passes from the network into computing device 5, it travels through a network interface, Internet Protocol (IP) input queue, and TCP/IP processing routines, to eventually arrive at a socket 5c. Server program 5a executes a server process with the responsibility of reading data from socket 5c.

Prior computing device 5 may be configured to read data off the socket using blocking I/O, nonblocking I/O, multiplexed I/O, or signal based I/O, as illustrated in FIG. 7. In blocking I/O, a server process 5d typically sends a command (e.g. RECVD) to read the socket, and waits for data to be ready on the socket. The process is blocked until the data is completely read from the socket. Prior web servers that use blocking I/O suffer from the problem that the server processes are blocked for lengthy time periods while waiting for data to appear on the sockets. Blocked processes consume valuable processor resources, and, in aggregate, slow the overall operation of the web server.

In nonblocking I/O, the server process repeatedly checks the socket to determine if data is ready, using, e.g., the EWOULDBLOCK command. The process sends a command to read the data (e.g. RECVD) only once it is determined that data is ready on the socket. Thus, the process is not continuously blocked while waiting for data to become ready on the socket. While an improvement over blocking I/O in terms of performance, the server process is blocked during the repeated checks to the socket to determine if data is ready. Prior web servers that use nonblocking I/O must manage these repeated checks for thousands of sockets at once, causing problematic delay under heavy loads.

In multiplexed I/O, the server process uses a command such as SELECT or POLL Unix commands to monitor a server socket to determine if data is ready to be read. The monitoring process is blocked while waiting for data to become ready on the socket, and again blocked when data is read from the socket. SELECT and POLL are not adequate for multiplexing I/O in a real world web server, because the web server would need to devote considerable processor time in order to monitor a large number of sockets at once, thereby resulting in delay and poor server performance under high load.

Regarding signal I/O, the author of perhaps the most widely used textbook on network programming has stated that "signal-driven I/O is next to useless with a TCP socket." See, W. Richard Stevens, Unix Network Programming Volume 1, 22.2 (p. 590) (1998 2$^{nd}$ Edition), the entire disclosure of which is herein incorporated by reference. The reason for this is that according to prior approaches the signal is generated by a large number of events on the socket, and does not always indicate that data is ready on the socket. In the Unix operating environment, for example, the signal I/O can be attempted using the SIGIO command. However, the signal is generated whenever a connection request has been completed on a listening socket, a disconnect request has been initiated, a disconnect request has been completed, half of a connection has been shut down, data has arrived on a socket, data has been sent to a socket, or an asynchronous error occurred. (Stevens, 591) Thus, the server process will spend considerable processor time responding to "false alarms" when data is not actually ready for reading on the socket.

None of these prior approaches adequately address the need of the modern web server under heavy load to respond quickly to requests from thousands of simultaneously requesting clients. Instead, each causes the web server to consume valuable processor time while waiting for data to be made available on the socket, or, in the case of the prior signal I/O approach, while responding to signals that turn out to be "false alarms."

Figure 1:
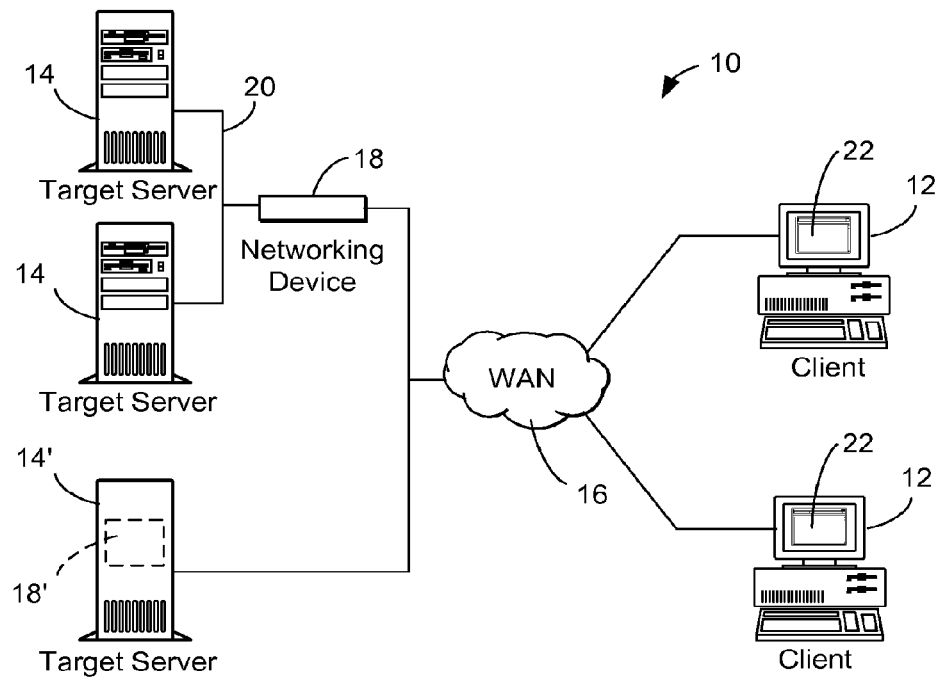
FIG. 1 is a schematic view of a networking system according to one embodiment of the present invention.

Turning now to FIG. 1, a networking system according to one embodiment of the present invention is shown generally at 10. Networking system 10 typically includes a plurality of clients 12 configured to exchange data with target web servers 14, via a networking device 18. Typically, clients 12 are configured to connect to networking device 18 via a Wide Area Network (WAN) 16 such as the Internet, and networking device 18 is configured to connect to target servers 14 via a Local Area Network (LAN) 20. Alternatively, other suitable computer networks may be used in place of WAN 16 and LAN 20. Networking device 18 is typically an acceleration device that acts as a proxy for the target server 14, and is configured to increase the speed of the exchange of data between clients 12 and target servers 14, as discussed below.

Typically, clients 12 are computing devices such as personal computers, portable computing devices, personal data assistants (PDAs), web-enabled wireless telephones, etc., and are configured to run a web browser 22 and to download web resources using the Hypertext Transfer Protocol (HTTP) and/or TCP/IP protocols from target web servers 14. Exemplary web resources include static HyperText Markup Language (HTML) files, dynamically generated HTML data, image data, video data, sound data, graphics data, executable code such as applets written in Javascript, common gateway interface modules, and virtually any other data downloadable at a Uniform Resource Indicator (URI) using the HTTP protocol, and interpretable by a web browser. Exemplary web browser programs 22 include the Netscape browser commercially available from Netscape Communications Corporation of Santa Clara, Calif. and the Internet Explorer browser commercially available from Microsoft Corporation of Redmond, Wash.

Figure 2:
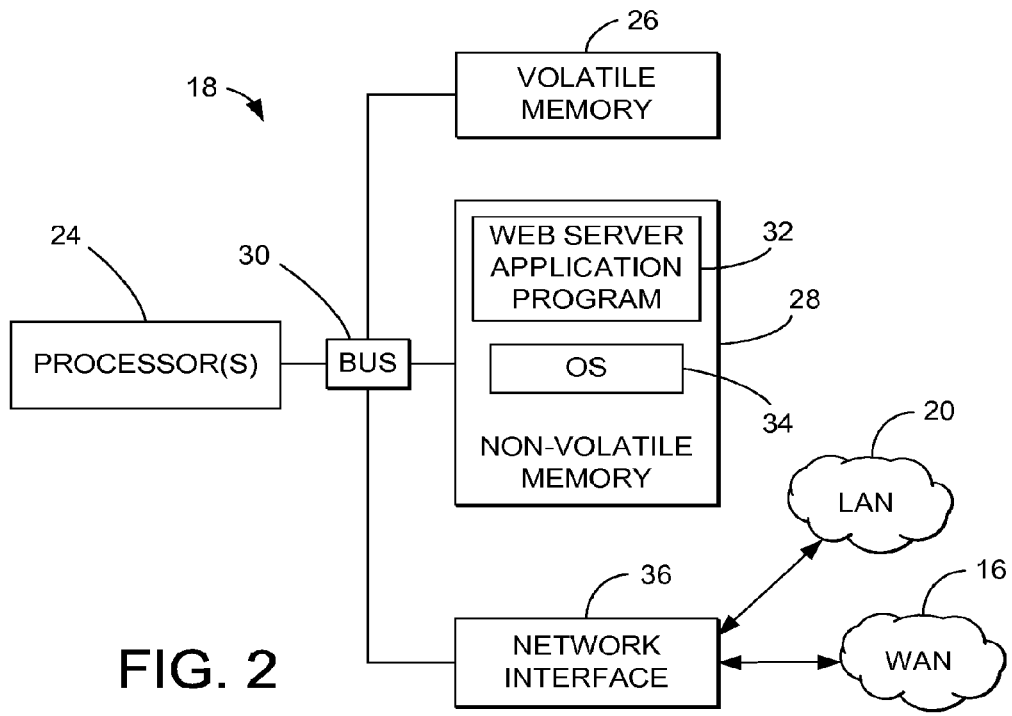
FIG. 2 is a schematic view of a networking device of the networking system of FIG. 1.

As shown in FIG. 2, clients 12 typically include a processor 24 configured to communicate with volatile memory 26, such as RAM, and non-volatile memory 28, such as Flash Memory, ROM, a hard drive, etc., via a bus 30, in order to execute a web server application program 32 and an operating system 34 stored in non-volatile memory 28. Typically, the operating system is a Unix compatible operating system, such as the BSD operating system developed at the University of California at Berkeley. Typically, the operating system includes a kernel, that is, a central module of the operating system responsible for process, task, and memory management. Although the term kernel is common to the Unix compatible operating systems, it will be understood that the present invention may be implemented using other operating systems, such as Microsoft WINDOWS and MacOS. Thus, any use of the term kernel should be understood not to be limited to the Unix environment, but as referring generally to that portion of any operating system that is responsible for process, task, and memory management. Typically the kernel is continuously resident in volatile memory 26 while the networking device is in operation.

Networking device 18 also typically includes a network interface 36 configured to enable the device to send and receive data, such as web resources, to and from WAN 16 and LAN 20. The data typically travels in packets according to the TCP/IP protocols. It will be understood that networking device 18 may be connected to a plurality of servers 14 in a one to many relationship, as shown in FIG. 1, or to only one server 14 in a one to one relationship. Networking device 18 may alternatively be installed as an integrated networking device 18', which typically includes software and/or hardware components that are installed within a server 14'.

In addition to the features described above, networking devices 18, 18' also may have features described with relation to the networking devices and acceleration devices disclosed in co-pending U.S. patent application Ser. Nos. 09/680,675, 09/680,997, and 09/680,998, filed Oct. 6, 2000, Nos. 60/239,552 and 60/239,071, filed Oct. 10, 2000, No. 60/287,188, filed Apr. 27, 2002, No. 09/882,375 filed Jun. 15, 2001, and No. 60/308,234 filed Jul. 26, 2001, and No. 60/313,006 filed Aug. 16, 2001, the disclosures of each of which are herein incorporated by reference.

Figure 3:
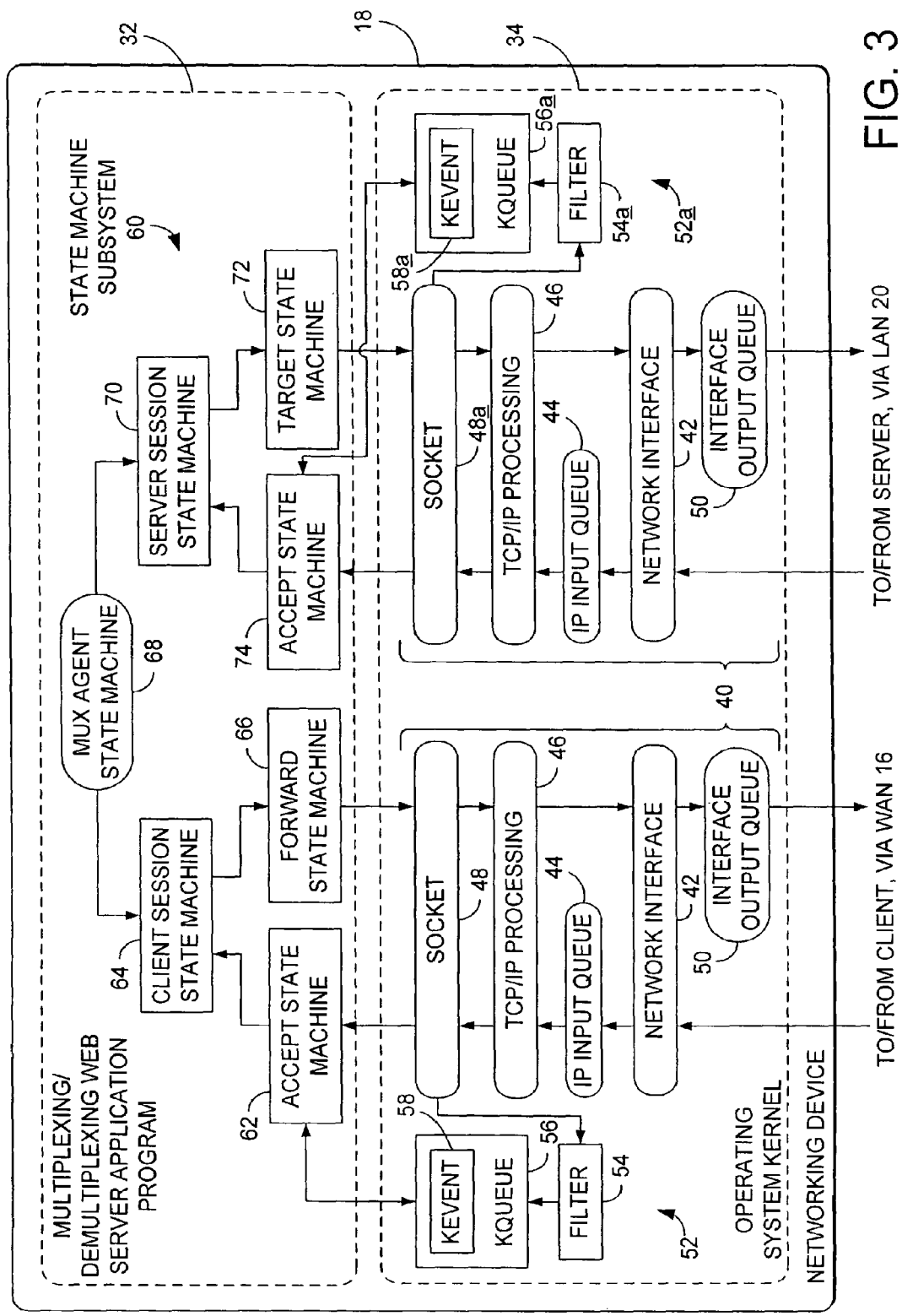
FIG. 3 is a schematic view of a software architecture of the networking device of FIG. 2.

FIG. 3 shows a software architecture of networking device 18. Networking device 18 is typically configured to execute an operating system 34 having a kernel. As discussed above, the operating system is typically a Unix compatible operating system such as BSD, although WINDOWS, MacOS, or virtually any other suitable operating system may be used. Networking device 18 is also typically configured to execute a web server application program 32. Because the web server application program 32 is typically positioned intermediate clients 12 and target servers 14, and serves data directly to clients 12 in the place of target servers 14, program 32 may be referred to as a "proxy" web server application program.

The operating system kernel is typically referred to as being at operating system level or kernel level, while application program 32 is typically referred to as being at application level or user process level. Management and scheduling routines in kernel 34 control which user processes have access to processor time for execution.

Typically, data from client 12 comes to networking device 18 through WAN 16 and enters a network input/output (I/O) routines 40 for processing. Network I/O routines 40 typically include a network interface 42 configured to initially receive data from the network, a IP input queue 44 configured to temporarily store data received from the network interface, TCP/IP processing routines 46 for managing TCP/IP connections, and a socket 48 for making the data available to application programs on networking device 18. Typically, data passes through the network interface 42 to be stored in IP input queue 44 until TCP/IP routines 46 are free to read the data from the IP input queue 44 and process the data. Once TCP/IP routines have processed the data, removing IP headers, etc., the data passes to a socket 48. A socket 48 that is associated with a particular client 12 may be referred to as a client socket.

Networking device 18 also typically includes an event-based signaling mechanism 52 configured to signal the web server application program 32 when data has arrived on a socket 48 of the operating system 34. The signaling mechanism 52 typically includes a filter 54, and a queue 56 of signaling events 58. Typically, filter 54 is configured to detect the arrival of data on the socket from the network, and in response, create a signaling event 58 in the queue 56 to signal to web server application 32 that data is ready for reading on the socket. Typically, the filter is not configured to cause signaling events to enter the queue under any other circumstances, thus ensuring that data is ready for reading on the socket when a signaling event is written into the queue. This reduces false alarms that occurred in prior art signaling methods, discussed above.

Typically the queue is a KQUEUE, and the events are KEVENTS, which are routines available for the 4.3 BSD operating system. Filter 54, event 58, and queue 56 are all operation system level components, and thus typically are given high priority by scheduling routines within operating system 34.

The web server application program 32 is typically configured to detect the entry of signaling event 58 into queue 56. Thus, the web server application program is configured to read data off of the socket in response to detecting signaling event 58, without polling the socket first to determine that data is ready to be read from the socket. Typically, accept state machine 62, described below, is the component of the web server application program 32 that is configured to detect event 58 in queue 56, although other components may alternatively be assigned this functionality.

Web server application program 32 typically is a configured as a proxy server, such that the web server application program receives requests from a client, sends the requests to a target server, receives responses from the target server, and forwards the responses to the requesting clients. Web server application program 32 typically includes a state machine subsystem 60 configured to accomplish these tasks. As used herein, the term state machine defines a program consisting of a set of states, and one or more transition functions which map input to from a current state to a next state. This is a very simple, but powerful, computational model, and its use in the present invention allows the web server application program to process data very quickly, consuming a minimum amount of processor time.

State machine subsystem 60 typically includes a first accept state machine 62 configured to detect event 58 created in queue 56 by the event-based signaling mechanism 52, and, in response, read data off of the socket 48 associated with the requesting client. State machine subsystem 60 also includes a forward state machine 66 configured to write data to the socket 48 associated with the requesting client. Typically, data written to the socket 48 will be related to a response from target server 14.

State machine subsystem 60 also includes a client session state machine 64 configured to manage network communications with the requesting client, via socket 48 associated with the client. Typically, this is accomplished by utilizing the first accept state machine 62 and the forward state machine 66 to read and write data to socket 48, as needed.

State machine subsystem 60 further includes a multiplexing agent 68 configured to control the flow of data between client session state machine 64 and one or more server session state machines 70, as described in more detail below with reference to FIGS. 4-5. Server session state machine 70 typically is configured to manage network communications with the target server, via the socket associated with the target server 48a. This is typically accomplished by utilizing a second accept machine 74 and a target state machine 72. The target state machine 72 is configured to write data to a socket 48a associated with a target server 14, and the second accept state machine 74 is configured to read data from a socket 48a associated with the target server. Socket 48a may alternatively be referred to as a target server socket. While only one target server socket is shown in FIG. 3, it should be appreciated that a single client typically connects to a server 14 through more than one server socket and more than one server session state machine, depending on congestion, as described in co-pending U.S. patent application Ser. No. 09/882,375 filed Jun. 15, 2001, the disclosure of which is herein incorporated by reference, and as described below with reference to FIGS. 4-5.

Similar to the first accept state machine, the second accept machine is configured to detect an event 58a created by a second event signaling mechanism 52a, and, in response, read data of off the socket 48a associated with the target server. The second event signaling mechanism 52a includes a filter 54a and event queue 56a similar to those described above, and functions similar to signaling mechanism 52, and will not be redescribed in detail for the sake of brevity.

Figure 4:
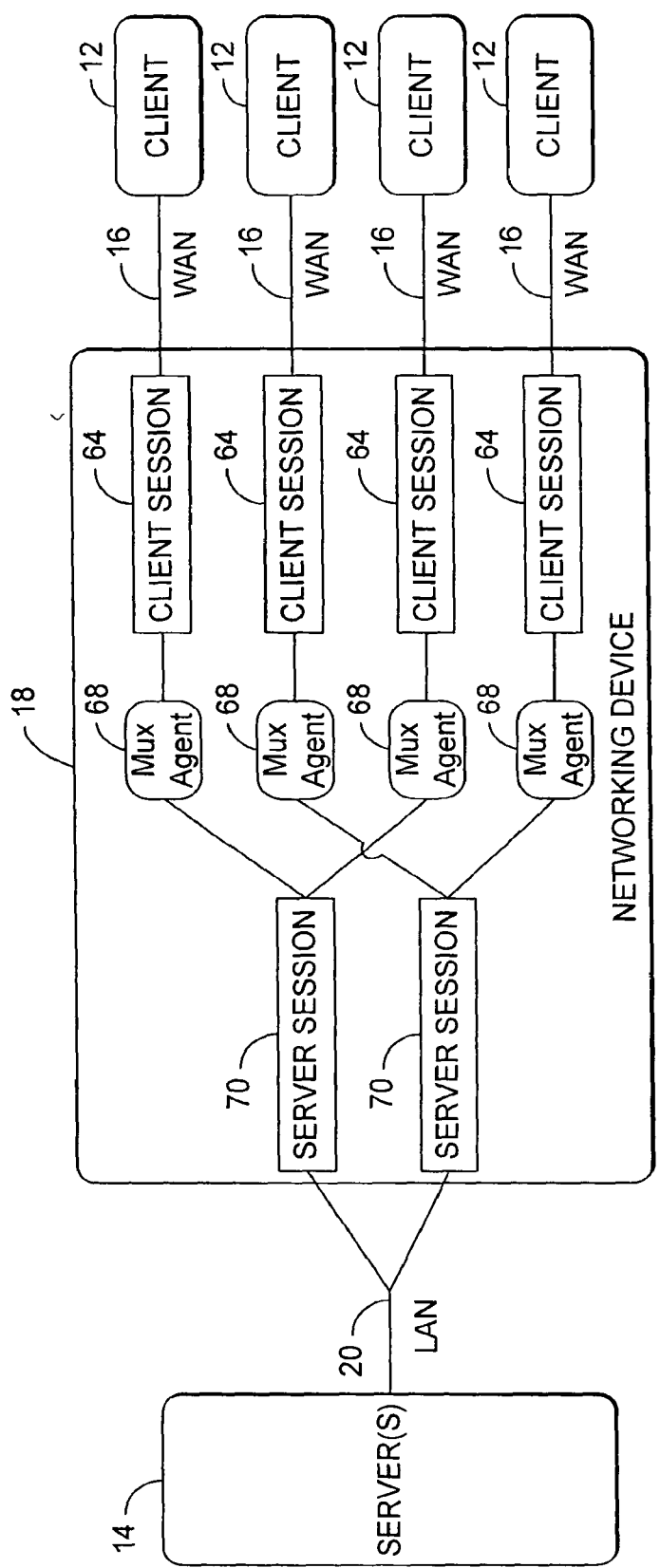
FIG. 4 is a schematic view of the networking system of FIG. 1, showing a plurality of multiplexing agents linking a number of client session state machines to a smaller number of server session state machines.
Figure 5:
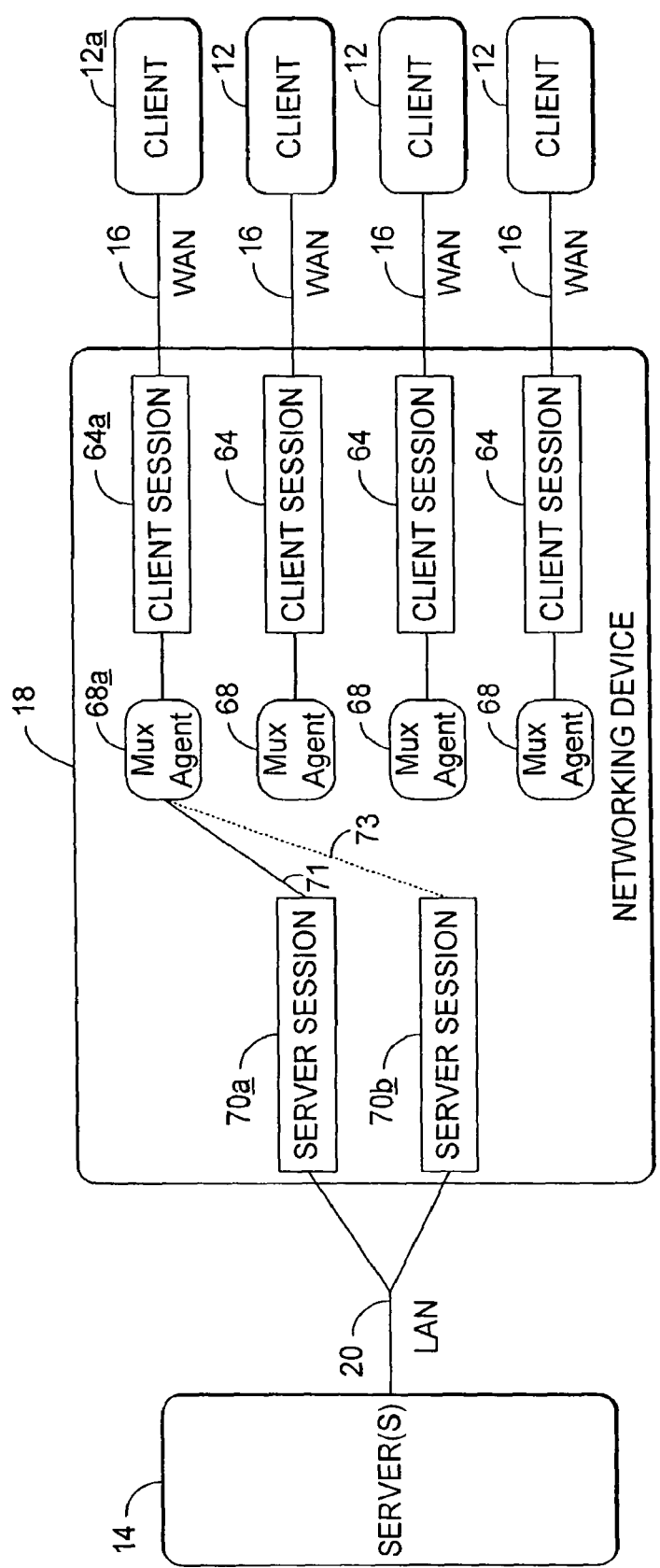
FIG. 5 is a schematic view of the networking system of FIG. 1, showing a single multiplexing agent communicating with a plurality of server session state machines.

As shown in FIG. 4, networking device 18 typically includes a plurality of multiplexing agents, the agents being configured to multiplex a number of client sessions handled by client session state machines 64 to a smaller number of server sessions handled by server session state machines 70. Typically, each multiplexing agent is configured to be associated with a single client session state machine, and is configured to be associated with a plurality of server session state machines, as shown in FIG. 5. Thus, data for a first request from a client 12a may pass through a client session 64a through a multiplexing agent 68a, and along path 71 to a first server session, while data for a second request from the same client may pass through a client session 64a, through a multiplexing agent 68a, and along path 73 to a second server session 70b. This enables the multiplexing agents to route requests to a least busy server socket, in order to optimize the response time of server 14. Alternatively, the multiplexing agent may be associated with more than one client session state machine, and/or only a single server session state machine.

In addition to performance advantages gained by routing requests to the least busy server socket, multiplexing the client sessions down to a smaller number of server sessions enables faster response time from server 14 because the server 14 is freed from managing a large number of simultaneous connections. Managing a large number of connections typically slows down a web server, because the server is constantly polling open connections to determine whether there is any activity on the connection.

Figure 6:
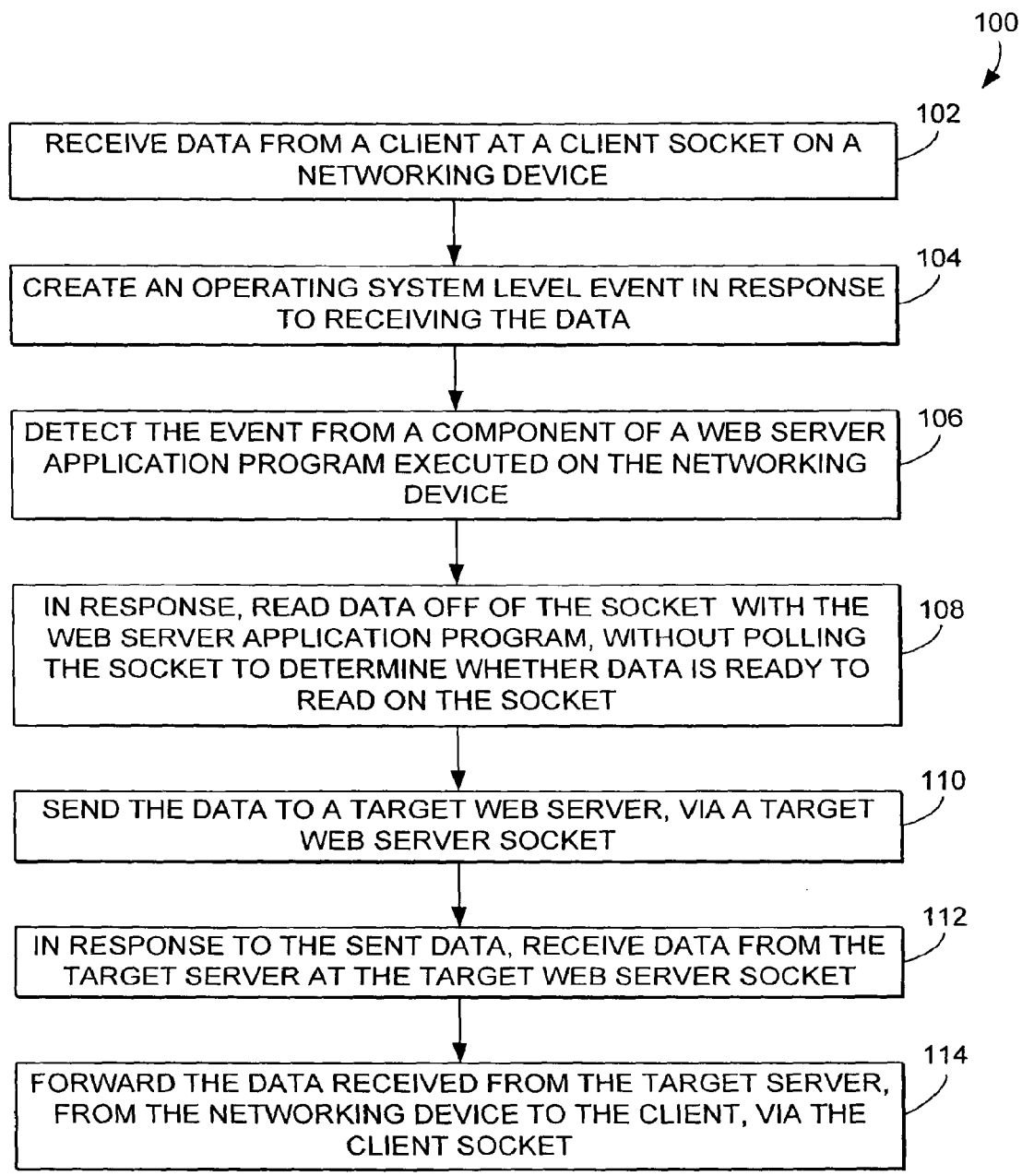
FIG. 6 is a flowchart of a method according to one embodiment of the present invention.

Turning now to FIG. 6, a method according to one embodiment of the present invention is shown generally at 100. Networking device 18, described above, is typically configured to implement method 100, and the other method embodiments described herein. Typically, method 100 includes, at 102, receiving data from a client at a client socket on networking device 18. The method further includes, at 104, creating an operating system-level event 58 in response to receiving the data. Typically, filter 54 is configured create the event upon detection of data entering socket 48, as described above. The event is typically entered in event queue 56.

At 106, the method further includes detecting the event 58 from a component of a web server application program 32 executed on the networking device. As described above, the event is typically detected by a first or second accept state machine 62, 74. Alternatively other components of web server application program 32 may be assigned this functionality, such as client session state machine 64, server state machine 70, or multiplexing agent state machine 68.

At 108, the method typically further includes, in response, reading data off of the socket with the web server application program, without polling the socket to determine whether data is ready to read on the socket.

At 110, the method typically includes sending the data to a target web server 14, via a target server socket. At 112, the method typically includes, in response to the sent data, receiving data from the target server 14 at the networking device 18, via the target server socket. At 114, the method typically includes forwarding the data received from the target server, from the networking device to the client via the client socket.

Method 100 may also include multiplexing the data from a number of client sessions handled by client session state machines to one of a smaller number of server sessions handled by server session state machines. Typically, the multiplexing is accomplished using multiplexing agents, as described above. The multiplexing agent is typically associated with a client session and at least one server session. Data traveling to and from a single client may be sent to a target server via one of a plurality of target server sockets, using the multiplexing agents as described above with reference to FIGS. 4-5.

According to another embodiment of the invention, a method for processing data received from a computer network by a networking device may be practiced. The method typically includes receiving data from a network at a networking device, temporarily storing the data on a socket of the networking device, and detecting the data stored on the socket using an operating system-level software component, and alerting an application-level process that data is ready to be read on the socket by creating an operating system-level signaling event. The method further typically includes detecting the event at the application level, and, in response, reading the data from the socket via the application-level process.

According to the embodiments of the present invention, faster networking devices, methods, and software architectures may be implemented for use with web technologies. Speed improvements are realized due to a number of factors. In particular, the event-based signaling mechanisms for alerting an application that data is ready on a socket, the state machine architecture of the web server application program components, and the use multiplexing state agents all contribute to improved performance for the devices, methods, and architectures described herein.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

The invention claimed is:

1. A networking device comprising:
    a processor;
    an operating system executing on the processor;
    an application program executing as a process on the operating system of the device, wherein the application program receives data from a client device by a client socket of the operating system, wherein the networking device is positioned between the client device and a target server;
    an event-based signaling mechanism within the operating system that triggers operating a system-level signaling event in response to each of a plurality of conditions associated with the client socket including data arriving on the client socket and at least one other condition associated with the client socket; and
a filter and an event queue within the operating system, the event queue of the operating system being associated with the client socket and accessible by the application program,
wherein the filter within the operating system receives the operating system-level signaling events and passes to the event queue only those operating-system-level events that were triggered in response to data arriving on the client socket without allowing any events that were triggered in response to any of the other conditions associated with the client socket to enter the event queue, and
wherein, in response to detecting one of the operating system-level signaling events in the event queue, the application program reads the data off of the client socket without polling the client socket first to determine that data is ready to be read from the client socket and forwards the data from the networking device to the target server.

2. The device of claim 1, wherein the other conditions associated with the client socket that trigger the operating-system level events include a completion of a connection request for the client socket, an initiation of a disconnection request for the client socket, a completion of the disconnection request for the client socket, a partial connection shutdown for the client socket, data being sent to server sockets, and asynchronous errors with respect to the client socket.

3. The device of claim 1, wherein the application program operates as a proxy server, such that the application program receives requests from the client, sends the requests to a target server, receives responses from the target server, and forwards the responses to the requesting clients.

4. The device of claim 1, wherein the application program includes a state machine subsystem.

5. The device of claim 4, wherein the state machine subsystem includes a first accept state machine that detects an event within the event queue, and, in response, read data off of the client socket associated with the requesting client.

6. The device of claim 5, wherein the state machine subsystem includes a forward state machine that writes data to the socket associated with the requesting client.

7. The device of claim 6, wherein the state machine subsystem includes a client session state machine that manages network communications with the requesting client, via the socket associated with the client, the first accept machine, and the forward state machine.

8. The device of claim 7, wherein the state machine subsystem includes a server session state machine that manages network communications with a target server, via server sockets associated with the target server, a second accept machine configured to read data from a server socket associated with the target server, and a target state machine configured to write data to a socket associated with a target server.

9. The device of claim 8, wherein the state machine subsystem includes a multiplexing agent that controls the flow of data between the client session state machine and one or more server session state machines.

10. A method for serving web resources, the method comprising:
receiving data from a client at a client socket on a intermediate networking device positioned between the client and at least one target server;
creating operating system-level events in response to each of a plurality of conditions associated with the client socket, wherein the plurality of conditions includes data arriving on the client socket and at least one other condition;
filtering the operating system-level events to pass to an event queue only the events that are created in response to receiving the data on the client socket;
detecting the events passed to the event queue from an application program executing on the networking device; and
in response to detecting the events passed to the event queue, reading data from the client socket with the application program without polling the client socket first to determine that the data is ready to be read from the client socket; and
forwarding the data read off of the client socket from the intermediate networking device to the target server.

11. The method of claim 10, wherein the other conditions associated with the client socket that trigger the operating-system level events include a completion of a connection request for the client socket, an initiation of a disconnection request for the client socket, a completion of the disconnection request for the client socket, a partial connection shutdown for the client socket, data being sent to server sockets, and asynchronous errors with respect to the client socket.

12. The method of claim 10, further comprising receiving data from the target server at the intermediate networking device in response to the data sent to the target server from the intermediate networking device.

13. The method of claim 10, further comprising forwarding the data received from the target server from the intermediate networking device to the client.

* * * * *